Jan. 30, 1962 T. L. MOFFITT ETAL 3,019,311
PUSH BUTTON SWITCH UNIT FOR TURN SIGNAL INDICATORS
Filed March 10, 1959 3 Sheets-Sheet 1

INVENTORS.
Thomas L. Moffitt.
BY Ned C. Herrmann.
Wood, Herron & Evans,
ATTORNEYS.

Jan. 30, 1962 T. L. MOFFITT ETAL 3,019,311
PUSH BUTTON SWITCH UNIT FOR TURN SIGNAL INDICATORS
Filed March 10, 1959 3 Sheets-Sheet 2

INVENTORS.
Thomas L. Moffitt.
BY Ned C. Herrmann.
Wood, Herron & Evans.
ATTORNEYS.

Jan. 30, 1962 T. L. MOFFITT ETAL 3,019,311
PUSH BUTTON SWITCH UNIT FOR TURN SIGNAL INDICATORS
Filed March 10, 1959 3 Sheets-Sheet 3

INVENTORS.
Thomas L. Moffitt.
BY Ned C. Herrmann.
Wood, Herron & Evans.
ATTORNEYS.

United States Patent Office 3,019,311
Patented Jan. 30, 1962

3,019,311
PUSH BUTTON SWITCH UNIT FOR TURN
SIGNAL INDICATORS
Thomas L. Moffitt and Ned C. Herrmann, Cincinnati,
Ohio, assignors to Northeast Capital Corporation, New
York, N.Y., a corporation of New York
Filed Mar. 10, 1959, Ser. No. 798,370
14 Claims. (Cl. 200—61.27)

This invention relates to switches and is particularly directed to a novel push button switch for controlling turn signal lamps on an automotive vehicle.

At the present time, it is conventional to equip automotive passenger vehicles and trucks with at least four lamps positioned at the front and rear of the vehicle on both the left and right sides thereof for indicating to approaching and following vehicles that a turn is contemplated. These indicator lamps may be separate direction indicator lamps or may be dual function lamps, such as combined turn signal and stop lights, or turn signal and parking lights, or on trucks turn signal and clearance marker lights.

In practice, the front and rear lamps on the left side of the vehicle are flashed to indicate a contemplated left hand turn and the lamps on the right side of the vehicle are flashed to indicate a right hand turn. It has also been found desirable to provide means whereby the lamps on both sides may be flashed simultaneously to serve as an "emergency stop" warning when a vehicle is forced to stop along the side of a highway due to some emergency condition.

The principal object of the present invention is to provide a novel push button type switch for controlling the signalling lights of automotive vehicles so that either the left hand signal lights or the right hand signal lights may be flashed to indicate a turn or both sets of lights may be flashed simultaneously to indicate an emergency stop.

A preferred form of switch constructed in accordance with the principles of the present invention comprises two selector push buttons shiftable in parallel directions between advanced and depressed positions. Each of the push buttons actuates a slidable contact plate effective to complete a suitable signalling circuit when the button is depressed. The present switch unit further comprises a spring urged latching rod effective to releasably secure the selector buttons in their depressed position. The latching rod and buttons are so constructed that when either selector button is depressed, it automatically releases the selector button previously depressed. Consequently, if a driver wishes to signal a left turn, and then desires to signal a right turn, he first presses the left selector button to indicate the left turn. This button is retained by the latch in its depressed position to maintain the flashing "left turn" signal throughout the turn. The driver thereafter presses the right selector button which automatically releases the left selector button, deenergizing the left turn signal lights and energizing the right turn signal lights. The push buttons and latch member are further constructed so that when both buttons are pushed simultaneously, the latch rod is effective to retain both of the buttons, whereby all of the signalling lamps are held energized.

The switch unit also includes a release button which is interconnected to the latching rod and is effective to normally spring urge that rod into its latching position. However, the release button is also effective when depressed to shift the latching rod to release either or both of the selector buttons which have previously been depressed.

In the preferred embodiment, this release button is movable in a different direction than the selector buttons. Specifically, the selector buttons project outwardly from the front face of the unit, while the release button projects from the top wall. This construction is highly advantageous for the driver since he can readily locate the buttons by feel and is not required to look at the switch unit.

One of the principal objects of the present switch is that it is extremely simple to use. The driver can quickly locate and actuate any of the three buttons to indicate a turn or cancel a signal. Also he can readily establish an emergency signal by merely simultaneously depressing the two selector buttons. Moreover, when the driver pushes the release button, he is absolutely certain that all of the signal lights are extinguished, it being totally unnecessary for him to locate a "neutral" position with a lever or actuate two cancelling levers, as required by prior art switches.

Another important object of the present invention is to provide a switch button unit which is extremely rugged and which provides trouble free operation over an extended period. It will readily be appreciated that a turn signal indicator is used many thousands of times during the life of a vehicle and at the same time is subjected to severe bumps and jars. The present switch button unit is of both simple and rugged construction and is not adversely affected by any of the incidents of normal usage, so that the switch remains trouble free in operation.

A further advantage of the present switch construction is that it is economical to manufacture and is quickly and easily assembled.

Another object of the present invention is to provide a simple means for visually indicating to the driver when either or both of the pairs of lamps has been energized. In accordance with the present invention, this visual indiaction is provided by means of two transparent "windows" and a pilot light effective to illuminate either or both translucent windows. Two movable shields are mounted beneath these windows, each of the shields being mechanically interconnected to one of the selector push buttons. Each shield normally blocks transmission of light through the adjacent window but is shifted to a position in which it uncovers the window when the associated push button is depressed. Thus, when either the left or right push button is depressed, the corresponding window is illuminated; and when both buttons are depressed, both windows are lighted.

These and other objects and advantages of the present invention will be more readily apparent from a consideration of the following detailed description of the drawings illustrating a preferred embodiment of the invention.

Figure 1:
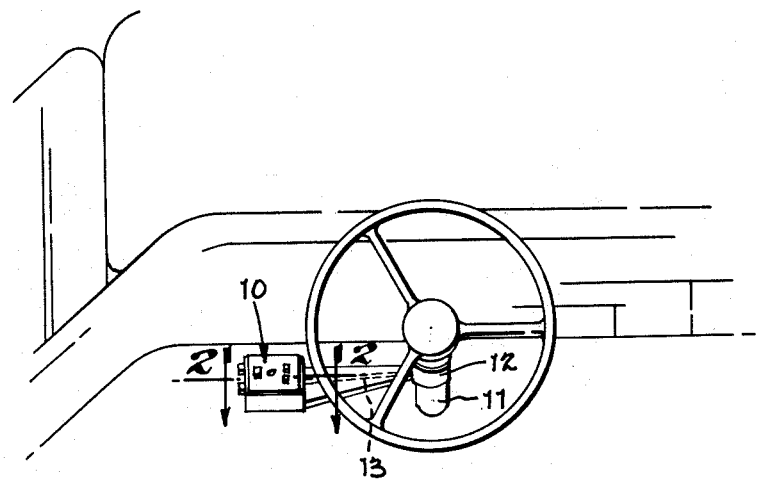
FIGURE 1 is a perspective view showing a push button turn signal switch constructed in accordance with the present invention mounted upon the steering post of a vehicle.

As is shown in FIGURE 1, a turn signal push button unit 10 constructed in accordance with the principles of the present invention is adapted to be mounted in a vehicle such as a truck cab in a position in which the unit is readily accessible from the driver's seat. One suitable form of mounting arrangement is shown in FIGURE 1. As is there shown, the switch unit 10 is mounted upon a bracket 12 which is in turn clamped around the steering column 11 and is joined to the switch unit in any suitable manner. Those skilled in the art will readily appreciate that many different mounting arrangements are possible. For example, the switch unit may be mounted upon the dash board, if desired. Suitable electric wires 13 extend from the push button switch to the lighting circuits for controlling the operation of the vehicle turn signal indicators.

Figure 2:
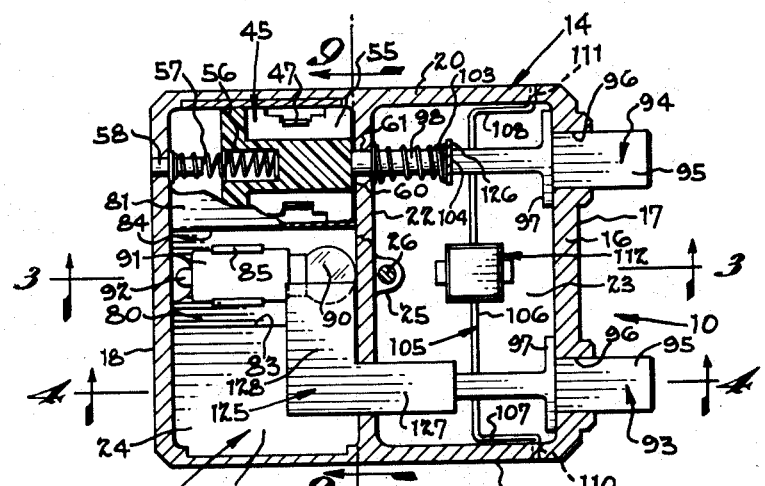
FIGURE 2 is a cross-sectional view through the push button switch taken along line 2—2 of FIGURE 1.
Figure 3:
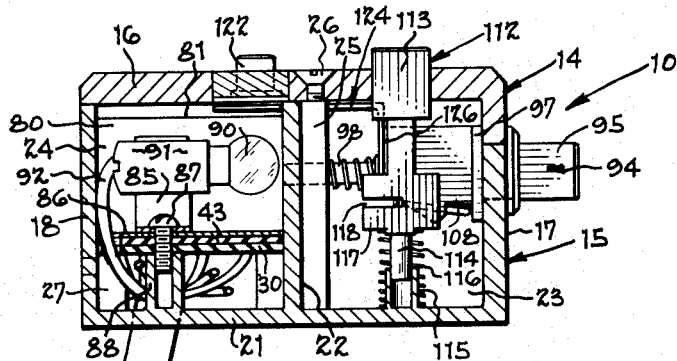
FIGURE 3 is a cross-sectional view taken along line 3—3 of FIGURE 2.

As is shown in FIGURE 2, the present push button switch comprises a housing 14 having a bottom base section 15 and a top cover section 16. The housing may be formed of any suitable material, for example, a die cast metal. Base section 15 is of generally rectangular cross-section including front wall 17, and rear wall 18 joined by side walls 20 and a bottom wall 21. A transverse wall 22 extends across the base section of the housing between the side walls 20 dividing the housing into a forward push button receiving compartment 23 and a rearward contact receiving compartment 24. Transverse wall 22 also includes a threaded boss 25 adapted to receive a bolt 26 which passes downwardly through a suitable opening in cover plate 16 for securing the cover plate 16 over base section 15.

The details of construction of the contacts are best shown in FIGURES 3–6 and 8. As there shown, contact chamber 24 of the housing is provided with four corner posts 27. These posts terminate in support shoulders 28 which are adapted to receive and support contact carrying sheet 30. Contact carrying sheet 30 is formed of any suitable rigid insulating material. This sheet carries a right hand set of contact buttons 31 and a left hand set of contact buttons 32 while these contact buttons respectively control the right and left hand signal lamps when the switch is to be mounted as shown in FIGURE 1. It will readily be appreciated that the wiring can be reversed so that contact buttons 31 control the left hand lamps and contact buttons 32 control the right hand lamps.

The right hand set of contact buttons 31 includes outer contact 33 and three linearly disposed contacts 34, 35 and 36. These contact buttons can be of any suitable construction; for example, double headed rivet type contacts in which the upper heads 37 of the contacts project upwardly from the face of sheet 30. The left hand set of contacts similarly includes an outer contact 38 and a linear row of contacts 40, 41 and 42.

Figure 8:
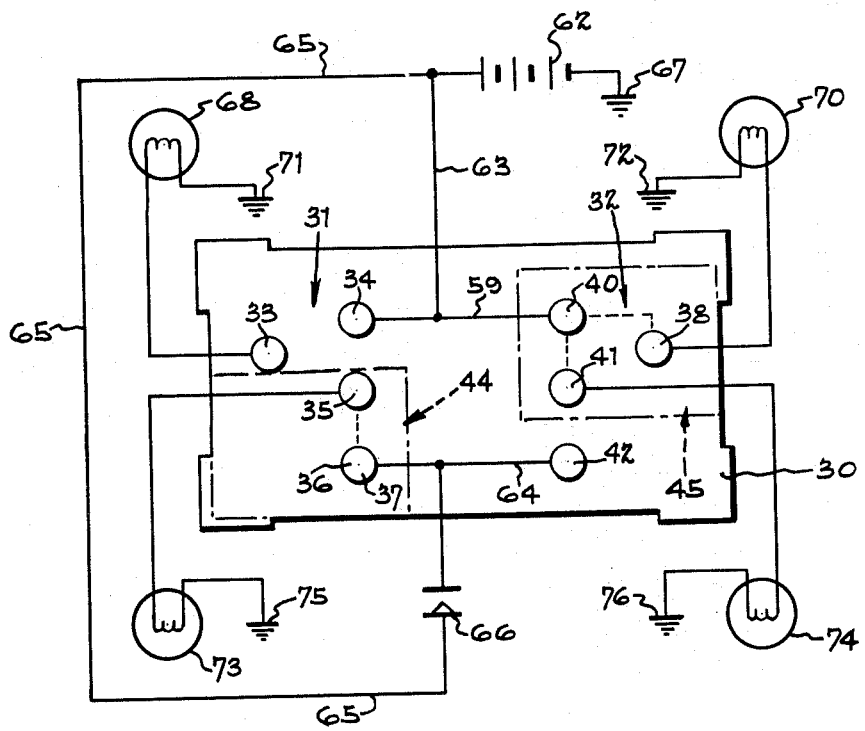
FIGURE 8 is a diagrammatic view of the stationary contacts showing electrical connections from the contacts to the vehicle lights.

As is shown in FIGURE 8, the left hand contacts control the energization of the left hand stop light and front directional signal light, while the right hand contacts control the energization of the right hand stop light and front directional signal light. It will readily be appreciated that these contacts can be used to control separate turn signal lights, clearance marker lights, or the like, if desired.

A second insulating sheet 43 is placed over contact carrying sheet 30. The second or cover sheet 43 is provided with a series of openings for receiving the contact buttons carried by sheet 30. The thickness of cover sheet 43 is such that the contacts protrude above its surface only a very small amount. Contact chamber 24 further encloses two slide members; namely right hand slide member 44 and left hand slide member 45. These two slide members are of substantially identical construction.

Figure 4:
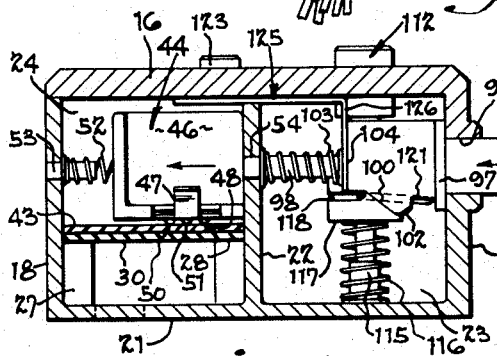
FIGURE 4 is a cross-sectional view taken along line 4—4 of FIGURE 2 showing a selector push button in its normal or extended position.

More specifically, the slide member 44 comprises a plastic carrier 46. Plastic carrier 46 supports a brass contact plate 47. As is shown in FIGURE 4, this brass contact plate is inserted in a recess in the bottom wall of the carrier member. A spring is compressed between the brass plate and a suitable opening formed in the carrier so that the brass plate is spring urged downwardly. The brass contact plate 47 is provided with three contact projections adapted to provide a bridging electrical connection between the stationary contacts. Forward and rearward projections 48 and 50 are disposed in longitudinal registry with the line of contacts 34, 35, and 36, the distance between contact projections 48 and 50 being the same as the distance between contacts 34 and 35 and 35 and 36. The center contact 51 on brass plate 47 is disposed in longitudinal alignment with outer contact 33 of the contact plate.

The rear wall of carrier member 46 is provided with an opening for receiving a compression spring 52 carried by a pin 53 press fitted into the rear wall 18 of base member 15. This spring is normally effective to urge slide member 44 to its forwardmost position. The details of this construction are shown in FIGURE 2 in which slide member 45 is shown in cross-section. The forward edge of the carrier member is provided with a vertical abutment face 49 in longitudinal alignment with a circular opening 54 provided in transverse wall 22.

The left hand slide member 45 is identical with right hand slide member 44 except that the contact plate on the left hand slide member has its forward and rearward contact projections in alignment with linearly disposed contacts 40, 41 and 42; and a single center contact disposed in longitudinal alignment with stationary contact button 38. Left hand slide member 45 includes a carrier 55, preferably formed of a molded plastic. This carrier is provided with a longitudinally extending bore 56 adapted to receive a spring 57 mounted on a pin 58 press fit in wall 18. The forward portion of carrier 55 also includes a vertical abutment face 60 disposed in longitudinal alignment with an opening 61 formed in transverse wall 22.

The electrical connections to the stationary contacts are best shown in FIGURE 8. As there shown, a conductor 59 joins contacts 34 and 40. This conductor is in turn connected to the main battery 62 through a lead 63 and a suitable flasher device (not shown). In a similar manner, stationary contacts 36 and 42 are joined together by a conductor 64 and this conductor is in turn connected to the positive terminal of the battery through a lead 65 and brake switch 66. The negative terminal of the battery is grounded as at 67.

The outer stationary contacts 33 and 38 are respectively connected to right hand front lamp 68 and left hand front lamp 70, these lamps being respectively grounded as at 71 and 72. In a similar manner, middle contacts 35 and 41 are respectively connected to right hand rear stop light 73 and left hand rear stop light 74, these lamps being grounded as at 75 and 76.

When the slides are in their normal forward position, as is illustrated by dotted lines 44 in FIGURE 8, a circuit is completed through the switch (as shown by the dotted lines) from the battery to the rear stop light through the brake switch. On the other hand, when a slide member is urged by actuation of a selector button to its rearmost position, as is indicated by dotted lines 45 in FIGURE 8, a circuit is directly completed from the battery through the flasher to the front lamp and to the rear lamp. These lights thus provide the usual flashing signal used to indicate a turn. When both switch plates are depressed, all of the vehicle signal lights flash to indicate an emergency condition.

Figure 9:
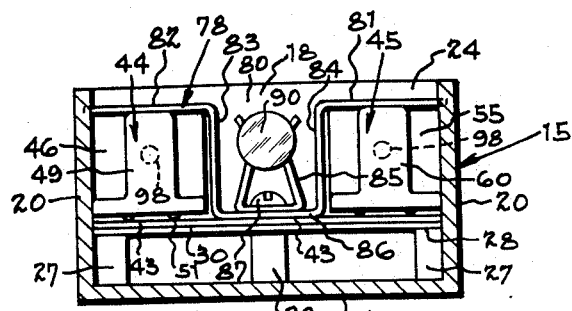
FIGURE 9 is a cross-sectional view taken along lines 9—9 of FIGURE 2.

Slide member 44 and slide member 45 are guided in their sliding movements and are maintained in longitudinal alignment with their respective contacts by means of a cover and guide plate 78. This plate 78 includes a central U-shaped portion 80 and horizontally extending flanges 81 and 82. Flange 82 engages the top of carrier member 46, while flange 81 overlies the top of carrier member 55. These flanges thus prevent upward movement of the carriers and thereby function to hold the brass contacts in engagement with the stationary contacts. As is shown in FIGURE 9, vertical arms 83 and 84 of plate 78 engage the side edges of carrier members 46 and 55 and are therefore effective to hold the carrier members in transverse alignment, the outer side edges of the carrier members sliding against side walls 20 of the housing.

A U-shaped bulb receiving clamp 85 is mounted above the bottom wall 86 of plate 78, this clamp and cover plate 78 being secured to the housing by means of a bolt 87 which passes downwardly through the clamp and plate and threadably engages a socket 88 formed in base section 15 of the housing. Clamp 85 is adapted to support an electric pilot lamp 90 which is mounted in a conventional bayonet type sleeve 91, the insulated terminal of the bulb being connected to an electric lead 92.

The push button mechanism for selectively positioning slide members 44 and 45 is best shown in FIGURES 2–7. As is there shown, the right hand slide member 44 is controlled by right hand selector button 93 while left hand slide 45 is controlled by left hand selector button 94. These buttons project outwardly from front wall 17 of the housing.

Each of the push button members is identical and preferably comprises a unitary plastic molding of "nylon" or the like. The molding is configurated to form a "button" or projecting portion 95 which extends outwardly through an opening 96 in the front wall 17 of the housing. Stop flanges 97 are formed on the push button member to limit outward movement of the member relative to the housing. The opposite end of the push button member comprises a plunger, or shank portion 98 which extends rearwardly through circular openings 54 formed in the transverse wall. The end of this plunger portion engages the abutment face 49 of the carrier member. The button member also includes a depending angulated camming portion 100 and a latching notch 101. The rear face of latching notch 101 is vertical and is joined to the cam face 100 by a short angulated face 102.

A spring 103 is mounted over plunger portion 98 and is compressed between the transverse wall 22 and a shoulder 104 formed on the push button member. Spring 103 is normally effective to urge the push button member into its outwardly extending position as is shown in FIGURE 4. However, the push button is adapted to be forced inwardly against the force of spring 103 to the position shown in FIGURE 5. When the push button is depressed in this manner, slide member 46 is also forced rearwardly against compression spring 52.

A pivotally mounting latch bar 105 is provided for releasably securing one or both of the selector push buttons 93 and 94 in their depressed position. Latch rod 105 is a generally U-shaped member including a transverse arm portion 106 extending transversely across chamber 23 and forwardly extending parallel arms 107 and 108. The ends 110 and 111 of arms 107 and 108 are bent outwardly and are inserted in aligned openings provided in side walls 20 of the housing adjacent to front wall 17 of the housing.

Latching rod 105 is adapted to be shifted by release button 112 which projects upwardly through top wall 16 of the housing. Release button 112 is preferably a unitary molded member formed of nylon, or the like, and includes a button, or projecting portion 113 and a downwardly extending stem portion 114 which is slidably journalled in a boss 115 formed integral with bottom wall 21 of the housing. A spring 116 is compressed between this bottom wall and a shoulder 117 formed on the release button member. This spring normally urges the push button member upwardly to the position shown in FIGURE 3. The release member 112 also includes a transverse slot 118 which receives transverse arm 106 of latching rod 105. Release button 112 and its associated bias spring are thus effective to normally urge the latching rod to pivot upwardly (clockwise in FIGURES 3–6) to a position in which the latching rod abuts a bottom shoulder 120 formed on each of the selector push button members 93 and 94 adjacent to and rearwardly of cam face 100. The abutment of the latching member with these shoulders also limits outward movement of release button 112.

When either of the selector buttons 93 or 94 is depressed, latching rod 105 is cammed downwardly (counterclockwise in FIGURES 3–6) by camming surface 100. As the selector button is depressed further, transverse arm 106 of the latching rod passes beneath the camming surface and beneath angulated surface 102 and enters notch 101. When the selector button is released, outward movement of the button is prevented by abutment of arm 106 of the latching rod with vertical face 121 of notch 101.

In addition to these elements, the present switch button unit comprises right and left pilot indicators 122 and 123 which respectively provide a visual indication when the right or left turn signals have been actuated. More particularly, each of the pilot indicators 122 and 123 comprises a translucent "window" formed of plastic, or the like, which is press fit or otherwise mounted in top member 16 of the housing. These translucent "windows" are disposed substantially over pilot bulb 90, window 122 being disposed slightly to the right of the bulb and window 123 being disposed slightly to the left of the bulb. Movable shields 124 and 125 are provided for covering and uncovering windows 122 and 123 in accordance with the positions of selector buttons 93 and 94 so that whenever either button 93 or 94 is depressed, the corresponding window 122 and 123 is illuminated.

More particularly, each of the shield members 124 and 125 comprises an angulated piece of sheet metal comprising a depending arm 126 having a round opening formed therein adapted to receive the plunger of one of the selector switch members. This depending arm 126 is held against vertical shoulder 104 of the switch member by compression spring 103. In addition to the depending arm 126, the shield member comprises a horizontal arm 127 and a transverse flap portion 128 which is disposed to cover the adjacent window when the push button is in its outer position and is disposed to uncover the window when the push button member is depressed. Thus, light from pilot bulb 90 can reach transparent windows 122 and 123 only when push buttons 93 and 94 are respectively depressed.

In operation, the selector push buttons 93 and 94 are normally urged outwardly by springs 103 to the position shown in FIGURE 2. The carrier members 46 and 55 are similarly spring urged forwardly to the position shown in FIGURES 2 and 4. The brass contact plates thus are in their forward bridging position as is indicated by lines 44 in FIGURE 8; and a circuit is thus completed to the rear stop light through brake switch 66.

Figure 5:
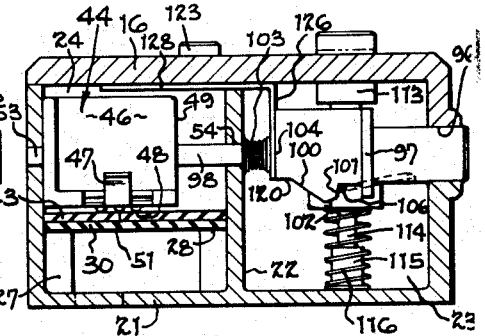
FIGURE 5 is a cross-sectional view similar to FIGURE 4 showing the push button locked in its depressed position.
Figure 6:
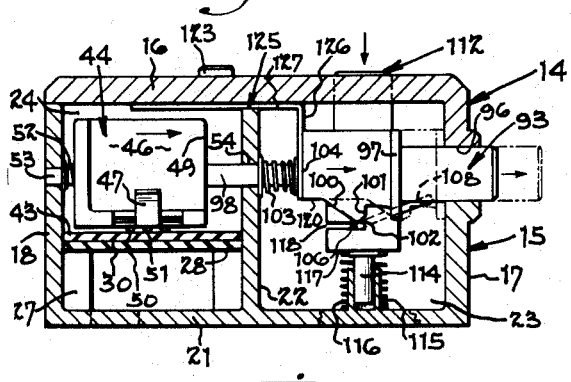
FIGURE 6 is a cross-sectional view similar to FIGURE 4 showing the manner in which the release button is depressed to release the selector button.
Figure 7:
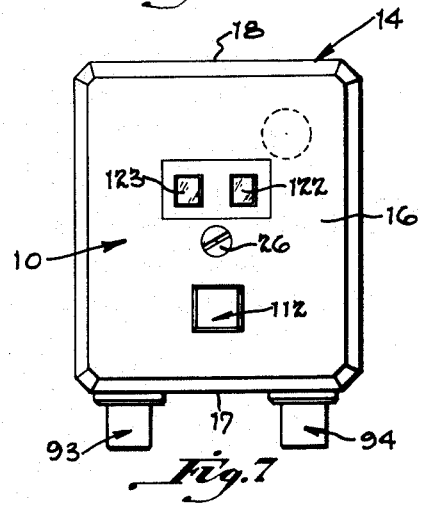
FIGURE 7 is a top plan view of the switch button unit.

Assuming that the driver desires to indicate a left hand turn, push button 94 is depressed. As the push button is shifted rearwardly, its plunger portion 98 forces carrier member 55 rearwardly. At the same time, camming surface 100 of the selector button engages transverse section 106 of latching rod 105 causing that rod to pivot downwardly about its endwise sections 110 and 111. As the latching rod pivots downwardly, it carries the release button 112 downwardly against compression spring 115. As the latching rod reaches the lowest point of its travel, as is shown in FIGURE 6, the button previously depressed is released, this release being facilitated by sloping shoulder 102. When push button 94 reaches its depressed position, latching rod 105 pivots upwardly under the force of spring 116 and engages shoulder 101 of the push button member, locking the push button in its depressed position, as is shown in FIGURE 5. The contacts associated with this push button are thus shifted to the position shown by dotted lines 45 in FIGURE 8 and a circuit is completed through the flasher (not shown) to the front and rear left hand signal lights.

At the completion of the turn, the signal is cancelled by depressing release button 112. Since as was explained above, this button has a transverse slot 118 which receives transverse section 106 of latching rod 105, when the release button is depressed the latching rod is rotated downwardly beneath shoulder 101 and sloping surface 102, thereby releasing the previously depressed button.

In the event that it is desired to signal an emergency stop, both buttons 93 and 94 are depressed simultaneously. Thus, both slide members 44 and 45 are shifted to their rearward bridging position. When depressed, both push buttons are retained in position by latching rod 105 in the manner explained above. In order to cancel the signal, it is only necessary to depress release button 112 causing the latching rod 105 to be pivoted beneath shoulders 101, as explained previously.

From the foregoing disclosure of the general principles of the present invention and the above description of a preferred embodiment, those skilled in the art will readily comprehend various modifications to which the invention is susceptible. Therefore, we desire to be limited only by the scope of the following claims.

Having described our invention, we claim:

1. A switch for turn signal indicators, said switch comprising a housing, a pair of movable contact plates, means mounting said contact plates for independent reciprocating movement within said housing, whereby said contact plates are shiftable between first and second positions, first and second selector push buttons mounted within said housing and in respective mechanical connection with each of said movable contact plates, spring means urging said contact plates to said first position, said selector push buttons when depressed being effective to shift said contact plates to said second position, a rotatable latching member disposed for engagement with each of said selector push buttons for releasably retaining said selector buttons in their depressed position, and a release button in mechanical connection with said latching member, said release button being movable in a direction perpendicular to the movement of said selector push buttons and being effective when depressed to rotate said latching member to disengage said latching member from said selector buttons and thereby release said selector buttons.

2. A switch for turn signal indicators, said switch comprising a housing, a pair of movable contact plates, means mounting said contact plates for independent reciprocating movement within said housing, whereby said contact plates are shiftable between first and second positions, first and second selector push buttons mounted within said housing and in respective mechanical connection with each of said movable contact plates, spring means urging said contact plates to said first position, said selector push buttons when depressed being effective to shift said contact plates to said second position, a rotatable latching member disposed for engagement with each of said selector push buttons for releasably retaining said selector buttons in their depressed position, and a release button in mechanical connection with said latching member, said release button being movable in a direction perpendicular to the movement of said selector push buttons and being effective when depressed to rotate said latching member to disengage said latching member from said selector buttons and thereby release said selector buttons, and spring means associated with said release button for urging said button outwardly, said spring means also being effective to urge said latching member into engagement with said selector buttons.

3. A switch for turn signal indicators, said switch comprising a housing, a pair of movable contact plates, means mounting said contact plates for independent reciprocating movement within said housing, whereby said contact plates are shiftable between first and second positions, first and second selector push buttons mounted within said housing and in respective mechanical connection with each of said movable contact plates, spring means urging said contact plates to said first position, said selector push buttons when depressed being effective to shift said contact plates to said second position, a latching member for releasably retaining said selector buttons in their released position, and a release button in mechanical connection with said latching member, said release button being effective when depressed to shift said latching member and thereby release said selector buttons, and pilot means for indicating when one of said selector buttons is depressed, said pilot means comprising an electric lamp bulb, two transparent windows in said housing adjacent to said lamp bulb, and movable shields associated with said selector push buttons, each of said shields normally covering said windows, but being shiftable away from said windows when the associated selector push button is depressed.

4. A switch for turn signal indicators, said switch comprising a housing, a transverse wall dividing said housing into a contact chamber and a push button chamber, a pair of movable contact plates, means mounting said contact plates for independent reciprocating movement within said push button chamber, whereby said contact plates are shiftable between first and second positions, selector push buttons mounted within said push button chamber and in respective mechanical connection with each of said movable contact plates, spring means urging said contact plates to said first position, said selector push buttons when depressed being effective to shift said contact plates to said second position, a rotatable latching member in said push button chamber, said latching member being disposed for engagement with each of said selector push buttons for releasably retaining said selector buttons in their depressed position, and a release button in mechanical connection with said latching member, said release button being effective when depressed to rotate said latching member to disengage said latching member from said selector buttons and thereby release said selector buttons.

5. A switch for turn signal indicators, said switch comprising a housing, a pair of movable contact members, means mounting said contact members for independent reciprocating movement within said housing, whereby said contact members are shiftable between first and second positions, first and second selector push buttons mounted within said housing in abutment with respective of said movable contact members, spring means urging said contact members to said first position, said selector push buttons when depressed being effective to shift said contact members to said second position, a rotatable latching rod including a portion extending transversely of said housing for engaging said selector buttons and retaining said selector buttons in their depressed position, and a release button in mechanical connection with said transverse portion of the latching rod, said release button being effective when depressed to rotate said latching member and disengage said latching member from said selector buttons.

6. A switch for turn signal indicators, said switch comprising a housing, a pair of movable contact members, means mounting said contact members for independent reciprocating movement within said housing, whereby said contact members are shiftable between first and second positions, first and second selector push buttons mounted within said housing in abutment with respective of said movable contact members, spring means urging said contact members to said first position, said selector push buttons when depressed being effective to shift said contact members to said second position, a rotatable latching rod including a portion extending transversely of said housing for engaging said selector buttons and retaining said selector buttons in their depressed position, and a release button in mechanical connection with said transverse portion of the latching rod, said release button being effective when depressed to rotate said latching member and disengage said latching member from said selector buttons, and spring means normally urging said release button outwardly whereby said release button normally urges said transverse portion of the latching member into engagement with said selector buttons.

7. A switch for turn signal indicators, said switch comprising a housing, a pair of movable contact members, means mounting said contact members for independent reciprocating movement within said housing, whereby said contact members are shiftable between first and second positions, first and second selector push buttons mounted within said housing in abutment with respective of said movable contact members, spring means urging said contact members to said first position, said selector push buttons when depressed being effective to shift said contact members to said second position, a rotatable latching rod including a portion extending transversely of said housing for engaging said selector buttons and retaining said selector buttons in their depressed position, and a release button in mechanical connection with said transverse portion of the latching rod, said release button being shiftable in a direction perpendicular to the direction of movement of said selector push buttons and being effective when depressed to rotate said latching member and disengage said latching member from said selector buttons, and spring means normally urging said release button outwardly, whereby said release button normally urges said transverse portion of the latching member into engagement with said selector buttons.

8. A switch for turn signal indicators, said switch comprising a housing, a pair of movable contact members, means mounting said contact members for independent reciprocating parallel movement within said housing, whereby said contact members are shiftable between first and second positions, first and second selector push buttons mounted within said housing and having plunger portions in abutment with respective of said movable contact members, spring means urging said contact members to said first position, said selector push buttons when depressed being effective to shift said contact members to said second position, each of said selector buttons having a camming portion and a notch portion, a spring urged rotatable latching member disposed for reception in the notch portions of said selector buttons for retaining said selector buttons in their depressed position, and a release button at right angles to the axis of movement of said selector parts and in mechanical connection with said latching member, said release button being effective when depressed to rotate said latching member and disengage said latching member from said notch and thereby release said selector buttons.

9. A switch for turn signal indicators, said switch comprising a housing, a pair of movable contact members, means mounting said contact members for independent reciprocating parallel movement within said housing, whereby said contact members are shiftable between first and second positions, first and second selector push buttons mounted within said housing and having plunger portions in abutment with respective of said movable contact members, spring means urging said contact members to said first position, said selector push buttons when depressed being effective to shift said contact members to said second position, each of said selector buttons having a camming portion and a notch portion and an angulated face intermediate said camming portion and said notch portion, a spring urged latching member disposed for reception in the notch portions of said selector buttons for retaining said selector buttons in their depressed position, and a release button in mechanical connection with said latching member, said release button being effective when depressed to disengage said latching member from said notch and thereby release said selector buttons.

10. A switch for turn signal indicators, said switch comprising a housing having a front wall, side walls, and a top wall, a pair of movable contact members, means mounting said contact members for independent reciprocating parallel movement within said housing, whereby said contact members are shiftable between first and second positions, first and second selector push buttons mounted within said housing and having plunger portions in abutment with respective of said movable contact members, said selector push buttons extending outwardly through the said front wall, spring means urging said contact members to said first position, said selector push buttons when depressed being effective to shift said contact members to said second position, each of said selector buttons having a cam portion and a shoulder, a latching rod, said latching rod having a U-shaped portion including an arm extending transversely of said housing and two longitudinal arms, means mounting said arms adjacent to the front wall of said housing, spring means urging said latching rod into engagement with said selector buttons, whereby said latching rod engages said shoulder when a selector button is depressed and thereby releases said selector button in its depressed position, and a release button in mechanical connection with said latching member, said release button being effective when depressed to disengage said latching member from said shoulder and thereby release said selector button.

11. A switch for turn signal indicators, said switch comprising a housing having a front wall, side walls, and a top wall, a pair of movable contact members, means mounting said contact members for independent reciprocating parallel movement within said housing, whereby said contact members are shiftable between first and second positions, first and second selector push buttons mounted within said housing and having plunger portions in abutment with respective of said movable contact members, said selector push buttons extending outwardly through the said front wall, spring means urging said contact members to said first position, said selector push buttons when depressed being effective to shift said contact members to said second position, each of said selector buttons having a cam portion and a shoulder, a latching rod, said latching rod having a U-shaped portion including an arm extending transversely of said housing and two longitudinal arms, means mounting said arms on the side walls of said housing, spring means urging said latching rod into engagement with said selector buttons, whereby said latching rod engages said shoulder when a selector button is depressed and thereby releases said selector button in its depressed position, and a release button in mechanical connection with said latching member, said release button being effective when depressed to disengage said latching member from said shoulder and thereby release said selector button.

12. A switch for turn signal indicators, said switch comprising a housing including a transverse wall dividing said housing into two chambers, a pair of slidable contact members, a plurality of stationary contacts, means mounting said slidable contact members for independent reciprocating parallel movement within said housing, said means comprising a U-shaped cover plate having vertical walls and horizontal flanges in engagement with said contact members, whereby said contact members are shiftable between first and second positions, first and second selector push buttons mounted within said housing and having portions in abutment with respective of said movable contact members, spring means urging said contact members to said first position, said selector push buttons when depressed being effective to shift said contact members to said second position, a latching member for releasably retaining said selector buttons in their depressed position, and a release button in mechanical connection with said latching member, said release button being effective when depressed to shift said latching member and thereby release said selector buttons.

13. A switch for turn signal indicators, said switch comprising a housing including a transverse wall dividing said housing into two chambers, said transverse wall having two spaced bores formed therein, a pair of slidable contact members, a plurality of stationary contacts, means mounting said slidable contact members for independent reciprocating parallel movement within said housing, said means comprising a U-shaped cover plate having vertical walls and horizontal flanges in engagement with said contact members, whereby said contact members are shiftable between first and second positions, first and second selector push buttons mounted within said housing and having portions in abutment with respective of said movable contact members, said portions passing through said bores in said transverse wall, spring means urging said contact members to said first position, said selector push buttons when depressed being effective to shift said contact members to said second position, a latching member for releasably retaining said selector buttons in their depressed position, and a release button in mechanical connection with said latching member, said release button being effective when depressed to shift said latching member and thereby release said selector buttons.

14. A switch for turn signal indicators, said switch comprising a housing including a transverse wall dividing said housing into two chambers, said transverse wall having two spaced bores formed therein, a pair of slidable contact members, a plurality of stationary contacts, means mounting said slidable contact members for independent reciprocating parallel movement within said housing, said means comprising a U-shaped cover plate having vertical walls and horizontal flanges in engagement with said contact members, whereby said contact members are shiftable between first and second positions, first and second selector push buttons mounted within said housing and having portions in abutment with respective of said movable contact members, said portions passing through said bores in said transverse wall and being journalled thereby, spring means urging said contact members to said first position, said selector push buttons when depressed being effective to shift said contact members to said second position, a latching member for releasably retaining said selector buttons in their depressed position, and a release button in mechanical connection with said latching member, said release button being effective when depressed to shift said latching member and thereby release said selector buttons.

References Cited in the file of this patent

UNITED STATES PATENTS

| | | |
|---|---|---|
| 1,106,432 | Wilcox | Aug. 11, 1914 |
| 1,303,423 | Vanderhoff | May 13, 1919 |
| 1,607,270 | Smith | Nov. 16, 1926 |
| 1,614,510 | Wicks | Jan. 18, 1927 |
| 1,632,643 | Cobb et al. | June 14, 1927 |
| 2,186,098 | Corpora | Jan. 9, 1940 |
| 2,502,042 | Hasselbaum | Mar. 28, 1950 |
| 2,831,075 | Dumke et al. | Apr. 15, 1958 |
| 2,886,743 | Hollins | May 12, 1959 |